United States Patent
Wang et al.

(10) Patent No.: US 12,554,034 B2
(45) Date of Patent: Feb. 17, 2026

(54) METHODS AND APPARATUS FOR DETERMINING DIELECTRIC CONSTANT AND RESISTIVITY WITH ELECTROMAGNETIC PROPAGATION MEASUREMENTS

(71) Applicants: Schlumberger Technology Corporation, Sugar Land, TX (US); SAUDI ARABIAN OIL COMPANY, Dhahran (SA)

(72) Inventors: Gong Li Wang, Sugar Land, TX (US); Dean M. Homan, Damon, TX (US); Ping Zhang, Beijing (CN); Wael Abdallah, Al-Khobar (SA); Shouxiang Ma, Dhahran (SA)

(73) Assignees: SCHLUMBERGER TECHNOLOGY CORPORATION, Sugar Land, TX (US); SAUDI ARABIAN OIL COMPANY, Dhahran (SA)

( * ) Notice: Subject to any disclaimer, the term of this patent is extended or adjusted under 35 U.S.C. 154(b) by 475 days.

(21) Appl. No.: 18/044,622

(22) PCT Filed: Sep. 9, 2021

(86) PCT No.: PCT/US2021/049691
§ 371 (c)(1),
(2) Date: Mar. 9, 2023

(87) PCT Pub. No.: WO2022/056147
PCT Pub. Date: Mar. 17, 2022

(65) Prior Publication Data
US 2023/0375739 A1 Nov. 23, 2023

Related U.S. Application Data

(60) Provisional application No. 63/076,176, filed on Sep. 9, 2020.

(51) Int. Cl.
*G01V 3/20* (2006.01)
*G01V 3/26* (2006.01)
(Continued)

(52) U.S. Cl.
CPC .................. *G01V 3/20* (2013.01); *G01V 3/26* (2013.01); *G01V 3/34* (2013.01); *G01V 3/38* (2013.01)

(58) Field of Classification Search
CPC ........ G01N 33/0031; G01V 3/02; G01V 3/04; G01V 3/06; G01V 3/08; G01V 3/20; G01V 3/22; G01V 3/24; G01V 3/26
See application file for complete search history.

(56) References Cited

U.S. PATENT DOCUMENTS

| 3,891,916 A | 6/1975 | Meador |
| 4,899,112 A | 2/1990 | Clark |

(Continued)

FOREIGN PATENT DOCUMENTS

| WO | 2006031872 A1 | 3/2006 |
| WO | 2024015701 A1 | 1/2024 |

OTHER PUBLICATIONS

International Search Report and Written Opinion issued in International Patent application PCT/US2021/049691 on Dec. 3, 2021, 9 pages.

(Continued)

*Primary Examiner* — Tung X Nguyen
(74) *Attorney, Agent, or Firm* — Dayo Aladeniyi

(57) ABSTRACT

A method for estimating resistivity and dielectric constant values of a multi-layer subterranean formation acquiring electromagnetic propagation measurements of the subterranean formation and processing the measurements via inversion to compute the resistivity and dielectric constant values. A one-dimensional formation model is utilized including a (Continued)

plurality of formation layers in which each of the formation layers includes a resistivity value and a dielectric constant value.

18 Claims, 6 Drawing Sheets

(51) Int. Cl.
    *G01V 3/34*         (2006.01)
    *G01V 3/38*         (2006.01)

(56) References Cited

U.S. PATENT DOCUMENTS

| | | |
|---|---|---|
| 2010/0324826 A1 | 12/2010 | Luling |
| 2014/0214324 A1 | 7/2014 | Freedman |
| 2015/0241592 A1 | 8/2015 | Itskovich |
| 2016/0170069 A1* | 6/2016 | Wang ............... G01V 3/28 324/338 |
| 2016/0245080 A1 | 8/2016 | Sun |
| 2018/0003853 A1 | 1/2018 | Ewe |
| 2018/0203151 A1* | 7/2018 | Kouchmeshky ......... G01V 3/38 |
| 2019/0094405 A1* | 3/2019 | Itskovich ................. G01V 3/28 |
| 2019/0129056 A1 | 5/2019 | Rasmus |
| 2019/0353819 A1 | 11/2019 | Wang |

OTHER PUBLICATIONS

Wu et al., Dielectric-Independent 2-MHz Propagation Resistivities. Society of Petroleum Engineers, SPE Annual Technical Conference and Exhibition held in Houston, Texas, Oct. 3-6, 1999, 19 pages.
Haugland, S. M., New Discovery with Important Implications for LWD Propagation Resistivity Processing and Interpretation, Paper LL, Presented at SPWLA 60th Annual Logging Symposium held in Houston, Texas, USA, Jun. 17-20, 2001, 14 pages.
Anderson et al., Observations of Large Dielectric Effects on LWD Propagation-Resistivity Logs, Paper BB, Presented at SPWLA 48th Annual Logging Symposium held in Austin, Texas, United States, Jun. 3-6, 2007, 11 pages.
Stalheim, S. O., Deducting dispersive permittivity from LWD resistivity measurements: Paper VVVV, Presented at SPWLA 60th Annual Logging Symposium held in The Woodlands, TX, USA, Jun. 17-19, 2019, 18 pages.
Wang et al., Determining resistivity and lowfrequency dielectric constant using induction data in the presence of strong induced polarization, Paper PP, Presented at the SPWLA 60th Annual Logging Symposium held in The Woodlands, TX, USA Jun. 17-19, 2019, 17 pages.
Wang et al., Model-based correction for dip and shoulder effects on LWD propagation dielectric constant and resistivity logs, Presented at SPWLA 62nd Annual Logging Symposium held online from May 17-20, 2021, SPWLA-2021-0035, 18 pages.
Yan et al., 2-D Pixel-Based Inversion for Simultaneous Reconstruction of Resistivity and Dielectric Constant From Electromagnetic Logging While-Drilling Measurements, IEEE Transactions on Geoscience and Remote Sensing, vol. 60, Jul. 8, 2022, 2021, 14 pages.
International Preliminary Report on Patentability issued in International Patent application PCT/US2021/049691, dated Mar. 23, 2023, 8 pages.
Search Report and Written Opinion of International Patent Application No. PCT/US2023/069669 Dated Oct. 27, 2023, 11 Pages.
Extended Search Report issued in European Patent Application No. 21867603.9 dated Sep. 16, 2024, 9 pages.
Substantive Exam issued in Saudi Arabia Patent Application No. 121430127 dated Mar. 28, 2023, 12 pages.
2nd Substantive Exam issued in Saudi Arabia Patent Application No. 121430127 dated Jan. 29, 2024, 11 pages.

\* cited by examiner

METHODS AND APPARATUS FOR DETERMINING DIELECTRIC CONSTANT AND RESISTIVITY WITH ELECTROMAGNETIC PROPAGATION MEASUREMENTS

CROSS REFERENCE TO RELATED APPLICATIONS

This application claims priority to U.S. Provisional Patent Application Ser. No. 63/076,176, which was filed on Sep. 9, 2020 and is Incorporated by Reference herein in its entirety.

BACKGROUND

This disclosure relates generally to the use of well logging data to determine the properties of subsurface rock formations. More specifically, the invention is related to a full-wave inversion method for simultaneously determining the dielectric constant and resistivity of a multilayer dipping rock formation using electromagnetic propagation well logging data.

Electromagnetic logging measurements are commonly made in oilfield operations. Such measurements may provide formation resistivity and dielectric properties as well as information about remote geological features (e.g., remote beds, bed boundaries, and/or fluid contacts) not intercepted by the measurement tool. This information may be used to evaluate the water saturation and potential hydrocarbon bearing capacity of the formation as well as to provide information for steering the direction of drilling (e.g., in a geosteering operation).

Electromagnetic propagation measurements are primarily used to determine resistivity and resistivity anisotropy of subterranean reservoirs. In the majority of conventional reservoirs, the contribution of the displacement current on the measurement is so small that the dielectric constant can hardly be determined accurately at propagation frequencies. However, certain formations, such as clay bearing sedimentary formations, may have a large dielectric constant at propagation frequencies.

There is a need in the art for methods of processing electromagnetic propagation measurements to determine both formation resistivity and dielectric constant values in multi-layer clay bearing sedimentary formations.

SUMMARY

A method is disclosed for estimating resistivity and dielectric constant values of a multi-layer subterranean formation. The method includes acquiring electromagnetic propagation measurements of the subterranean formation and processing the measurements via inversion to compute the resistivity and dielectric constant values. A one-dimensional formation model is utilized including a plurality of formation layers in which each of the formation layers includes a resistivity value and a dielectric constant value.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
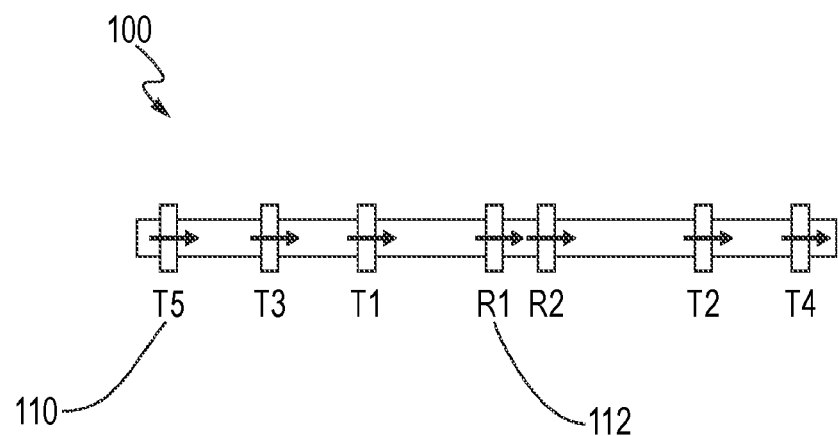
FIG. 1 depicts a schematic diagram of an example electromagnetic propagation tool that may be used to acquire electromagnetic logging measurements that may be processed to determine resistivity and dielectric constant of a multi-layer subterranean formation.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

A method is disclosed for estimating resistivity and dielectric constant values of a multi-layer subterranean formation. The method includes acquiring electromagnetic propagation measurements of the subterranean formation and processing the measurements via inversion to compute the resistivity and dielectric constant values. A one-dimensional formation model is utilized including a plurality of formation layers in which each of the formation layers includes a resistivity value and a dielectric constant value.

Embodiments of the disclosed methods utilize a full-wave pixel inversion that determines dielectric constant and resistivity simultaneously in a multilayer formation using data acquired by an electromagnetic propagation tool. The multilayer formation model includes a plurality of layers (e.g., sedimentary beds) where the dielectric constant and resistivity may vary from layer to layer. The bedding planes can be dipping relative to the tool plane. The inverse problem is solved iteratively using a Gauss-Newton approach. The use of the maximum entropy and the first derivative of the model for regularization ensures that the inversion converges rapidly for a wide range of initial guess models. The regularization parameter is chosen to be proportional to the data misfit to avoid the potential bias caused by the regularization terms.

Dielectric constant and resistivity logs determined using prior art techniques make use of a homogeneous formation model and commonly suffer from bed boundary and dipping effects. As a result, the calculations of water/hydrocarbon saturation that use the dielectric constant and resistivity may also be adversely affected. In contrast, the disclosed methods may advantageously deliver dielectric constant and resistivity values free of bed boundary and dipping effects because the layering and dipping of the formation are considered automatically in the one-dimensional (1D) formation model of the inversion. Moreover, when the dielectric effect is non-negligible, the resistivity log obtained using conventional processing techniques may be affected by the dielectric constant through the skin effect. The disclosed methods advantageously completely remove the dielectric effect on the resistivity log.

The dielectric constant obtained using the disclosed methods may advantageously be used to estimate water/hydrocarbon saturation of reservoirs on its own or together with resistivity. The resistivity of the inversion can be used in place of conventional propagation resistivity logs where dipping, bed boundary and/or dielectric effects are non-negligible.

Electromagnetic propagation well logging measures formation properties with the phase shift and attenuation of an electromagnetic field in a frequency in a range from about 200 kHz to about 4 MHz. For example, commercial propagation tools frequently make propagation measurements at 400 kHz and/or 2 MHz. Propagation measurements may be made by coupling an electromagnetic transmitter and one or more receivers. As is known to those of ordinary skill in the art, the antenna coupling may be accomplished by applying a time varying electrical current (an alternating current at a propagation frequency) in the transmitting antenna to transmit electromagnetic energy into the surrounding environment (including the formation). This transmitted energy generates a corresponding time varying magnetic field in the local environment (e.g., the tool collar, borehole fluid, and the formation). The magnetic field in turn induces electrical currents (eddy currents) in the conductive formation. These eddy currents further produce secondary magnetic fields which may produce a voltage response in a receiving antenna (the electromagnetic energy is received, for example, via measuring the complex voltage in the receiving antenna).

Given a propagation tool including one transmitter (T) and two receivers ($R_1$ and $R_2$), its measurements are given by:

$$AT + iPS = \ln\frac{V_1}{V_2} \quad (1)$$

where $V_1$ and $V_2$ represent voltages at corresponding receivers $R_1$ and $R_2$, and PS and AT represent phase shift and attenuation. In a homogeneous and isotropic formation, PS and AT may be expressed mathematically, for example, as follows:

$$AT + iPS = 3\ln\frac{L_2}{L_1} + ik(L_1 - L_2) + \ln\frac{1 - ikL_1}{1 - ikL_2} \quad (2)$$

where k represents the wavenumber of the formation, $k=\sqrt{i\Omega\mu(\sigma-i\omega\varepsilon)}$, with $\omega$ being angular frequency of the operating current, $\mu$ being magnetic permeability, and $\sigma$ and $\varepsilon$ being electric conductivity and permittivity of the formation. With continued reference to Eq. (2), $L_1$ and $L_2$ represent axial spacings (distances) between the receivers $R_1$ and $R_2$ and the transmitter T. Note that a point magnetic dipole model has been used to arrive at Eq. (2). For a multi-array propagation tool with multiple transmitters, the phase shift and attenuation can be written mathematically, for example, as follows:

$$AT_C + iPS_C = \sum_{l=1}^{N_T} \gamma_l C_l \ln\frac{V_{T_l R_1}}{V_{T_l R_2}} \quad (3)$$

where, $\gamma_l = \text{sgn}(L_{T_l R_2} - L_{T_l R_1})$, with $L_{T_l R_1}$ and $L_{T_l R_2}$ representing axial spacings of receivers $R_1$ and $R_2$ from transmitter $T_l$. With continued reference to Eq. 3, $V_{T_l R_1}$ and $V_{T_l R_2}$ represent voltages in receivers $R_1$ and $R_2$ when transmitter $T_l$ is fired (i.e., when receivers $R_1$ and $R_2$ are coupled with transmitter $T_l$) and $N_T$ represents the number of transmitters. Eq. (3) indicates that phase shift and attenuation of the composite tool is a weighted average of those measured by the subarray. In Eq. (3) $C_l$ represents a weight for each measurement made by transmitter $T_l$ and receivers $R_1$ and $R_2$. For a fully compensated tool, it is required that:

$$\sum_{l=1}^{N_T} \gamma_l C_l = 0 \quad (4)$$

The compensation condition in Eq. (4) ensures that the effect of receiver gain is eliminated. Moreover, the effect of borehole rugosity can be reduced.

It will be appreciated that electromagnetic induction measurements differ from electromagnetic propagation measurements in that in induction measurements the voltage measurements are used directly to infer formation properties. Moreover, electromagnetic induction measurements are made at significantly lower frequencies than electromagnetic propagation measurements, for example in a frequency range from about 10 kHz to about 100 kHz.

For a composite electromagnetic induction tool of multiple transmitters receivers, the induction measurement may be expressed mathematically as follows:

$$R + iX \equiv \sigma_a \equiv \frac{V}{K} = \frac{\sum_{j,k=1}^{n_T, n_R} \frac{N_{T_j} N_{R_k} A_{T_j} A_{R_k}}{L_{jk}} \sigma_{a,jk}}{\sum_{j,k=1}^{n_T, n_R} \frac{N_{T_j} N_{R_k} A_{T_j} A_{R_k}}{L_{jk}}} \quad (5)$$

where $\sigma_a$ represents the apparent conductivity, $\sigma_a = R + iX$, with R and X representing in-phase and quadrature signal measured by the tool, V represents the total electromotive force in all receivers, and K represents the tool constant, converting the electromagnetic force into apparent conductivity of the formation, given by $$K = \sum_{j,k=1}^{n_T, n_R} K_{jk},$$

where $$K_{jk} = -\frac{\omega^2 \mu^2 I N_{T_j} N_{R_k} A_{T_j} A_{R_k}}{4\pi L_{jk}} \quad (6)$$

In Eqns. (5) and (6) or $\sigma_{a,jk}$ represents the apparent conductivity of the transmitter-receiver pair $T_j$ and $R_k$, $\sigma_{a,jk} = V_{jk}/K_{jk}$, $N_{T_j}$ and $A_{T_j}$ represent the number of turns and area of transmitter $T_j$, $N_{R_k}$ and $A_{R_k}$ represent the number of turns and area of receiver $R_k$, $L_{jk}$ represents an axial spacing between $T_j$ and $R_k$, and I represents the operating current. Using the point magnetic dipole model for the tool, in a homogenous and isotropic formation gives the following expression $$V_{jk} = \frac{i\omega\mu I N_{T_j} N_{R_k} A_{T_j} A_{R_k}}{2\pi L_{jk}^3} e^{ikL_{jk}}(1 - ikL_{jk}) \quad (7)$$

For a balanced composite induction tool, it is required that $$\sum_{j,k=1}^{n_T, n_R} \frac{N_{T_j} N_{R_k} A_{T_j} A_{R_k}}{L_{jk}^3} = 0 \quad (8)$$

The balance condition in Eq. (8) is intended to eliminate the contribution to the X signal (the quadrature signal) from the direct coupling between all transmitter-receiver pairs. It will be appreciated that the above described difference in measurement principles and operating frequencies causes propagation and induction measurements to respond to formation properties in a different manner. For example, propagation measurements commonly have a larger skin effect than induction measurements, resulting in a more non-linear response. Such nonlinearity has to be accounted for in processing propagation measurements to obtain accurate estimates of formation properties. In contrast, a linear or quasi-linear (or approximately linear) methodology may give reasonable results for induction measurements in many situations. Moreover, the underlying physics of propagation measurements tends to be different than those of induction measurements. In particular, the cause (or dominant causes) of dielectric effects are different at different frequencies. At induction frequencies, the primary source of a large dielectric effect is metallic particles, such as pyrite and graphite, in the formation and the induced polarization on these particles. At propagation frequencies, the dominant source of a large dielectric effect is believed to be a Maxwell-Wagner effect that is caused by differences in relaxation times between two layers of different mineral compositions. In particular, platy-shaped grains in the formation tend to act as thin capacitors, giving rise to high dielectric constant.

Electromagnetic propagation measurements are commonly made using electromagnetic propagation tools. The electromagnetic propagation tools can include those known in the art or future known tools. Examples of electromagnetic propagation tools include, but not limited to, PeriScope™ ARC™ IMPulse™, EcoScope™, CDR™, MCR™ GeoSphere™, and IriSphere™ which are available from Schlumberger®. It will be appreciated that the electromagnetic propagation measurements may be made using wireline electromagnetic logging tools or logging while drilling (LWD) electromagnetic propagation tools. The disclosed embodiments are not limited in this regard.

FIG. 1 is a schematic of one example electromagnetic propagation tool that can be used to acquire electromagnetic measurements (data) to be processed using the disclosed methods. Electromagnetic propagation data are primarily used to determine resistivity and resistivity anisotropy of reservoirs because in the majority of conventional reservoirs, the contribution of the displacement current to, or the dielectric effect on the data is so small that the dielectric constant can hardly be determined accurately at propagation frequencies. It is customary to assume that dielectric constant is dependent upon conductivity in the processing for propagation logs. Examples of well logging tools that acquire propagation data are, array propagation tools, which can include ARC™, IMPulse™, and EcoScope™, and other commercially available or future known tools. The array propagation tools measure coaxial couplings to determine formation resistivity, as shown in FIG. 1. The array propagation tool 100 can include a plurality of transmitters 110 and a plurality of receivers 112. The array propagation tool 100 can include any number of transmitters 110 and receivers 112. In the depicted embodiment, propagation tool 100 includes axial transmitters T1, T2, T3, T4, and T5 deployed about a pair of axial receivers R1 and R2.

Figure 2:
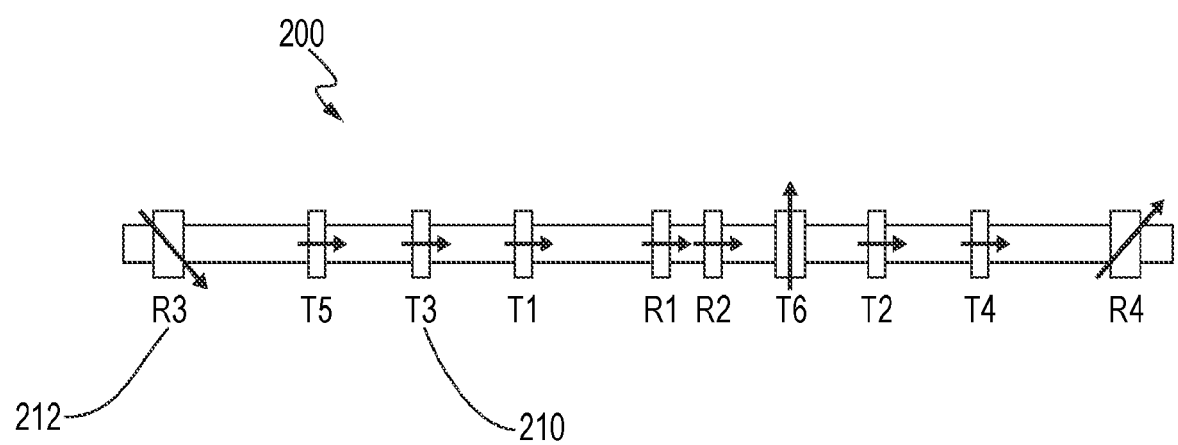
FIG. 2 depicts a schematic diagram of another example electromagnetic propagation tool that may be used to acquire electromagnetic logging measurements that may be processed to determine resistivity and dielectric constant of a multi-layer subterranean formation.

FIG. 2 depicts a schematic of another example electromagnetic propagation tool that may be used to acquire electromagnetic measurements (data) to be processed using the disclosed methods. Propagation tool 200 is a directional tool that measures transverse and cross couplings to determine formation resistivity and resistivity anisotropy as well as formation dip and azimuth. Propagation tool 200 may include Periscope™ or other known commercially available tools or future known tools. Propagation tool 200 differs from propagation tool 100 (FIG. 1) in that it includes a transverse transmitter T6 and tilted receivers R3 and R4 in addition to a number of axial transmitters and receivers. The depicted embodiment further includes axial transmitters T1, T2, T3, T4, and T5 deployed about a pair of axial receivers R1 and R2.

It will be understood that the disclosed embodiments are expressly not limited to the propagation tool embodiments depicted on FIGS. 1 and 2. The disclosed embodiments may be used to process substantially any suitable electromagnetic propagation measurements obtained from substantially any suitable electromagnetic propagation tool configuration, for example, including axial, transverse, tilted, biaxial, and triaxial antenna arrangements. Such antenna arrangements are well known in the industry and commonly used in electromagnetic transmitters and receivers used in propagation tools.

It has been observed that sometimes propagation phase shift and attenuation resistivity logs are clearly separate from each other in shales or shaly sands. Attenuation resistivity can read significantly higher than phase shift resistivity. This unusual behavior has been interpreted as caused by the presence of the interfacial polarization in the formation. The magnitude of the difference between phase shift and attenuation resistivity readings suggests that the dielectric constant can be determined in these formations at reasonable accuracy using propagation data.

To simulate the dielectric effect on propagation data, the displacement current term must be included in the Maxwell's equation, leading to a complex-valued conductivity:

$$\tilde{\sigma} = \sigma - i\omega\varepsilon_0\varepsilon_r \quad (9)$$

where $\sigma$, the first term, represents conductivity of the formation, $\varepsilon_r$ represents dielectric constant, and $\varepsilon_0$ represents electric permittivity of the vacuum. Here, we have assumed that the time dependence is $\exp(-i\omega t)$, where $\omega$ represents angular frequency and $i$ is the imaginary unit, $i=\sqrt{-1}$.

Figure 3:
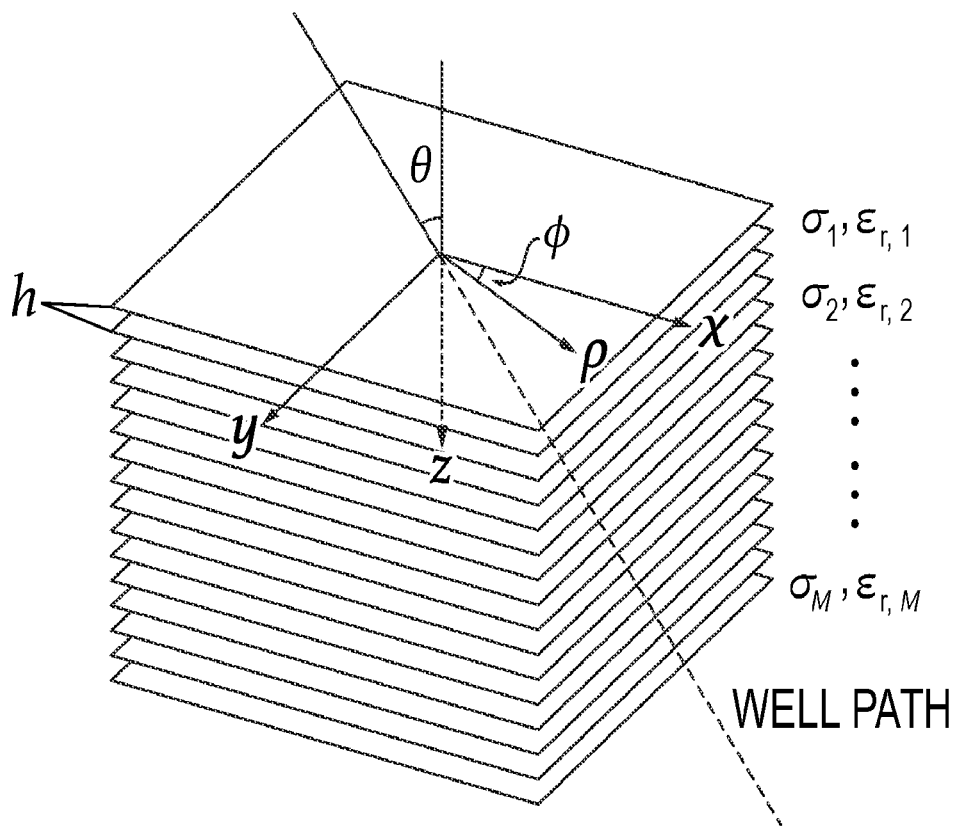
FIG. 3 depicts a schematic diagram of a one-dimensional (1D) formation model utilized in the disclosed methods. In this model the conductivity $\sigma$ and dielectric constant $\varepsilon_r$, may change in the z-direction, but are invariant in both the x- and y-directions. Angles $\theta$ and $\phi$ are the relative dip and azimuth of the well path.

The method attempts to determine formation conductivity and dielectric constant using measurements acquired with an electromagnetic propagation tool. In the inversion, the formation model takes a layered structure where conductivity and dielectric constant vary in one direction only, designated as the z-direction as shown in FIG. 3. The cost function that the inversion minimizes is given by:

$$\mathcal{L}(\sigma, \varepsilon_r) = \chi^2(\sigma, \varepsilon_r) - \gamma_P \mathcal{L}_P(\sigma, \varepsilon_r) + \gamma_S \mathcal{L}_S(\sigma, \varepsilon_r) \quad (10)$$

$$\chi^2(\sigma, \varepsilon_r) = \int_{-\infty}^{\infty} dz \left\{ \left[ \frac{d_{PS}(z; \sigma, \varepsilon_r) - d_{PS}^{OBS}(z)}{\Delta_{PS}} \right]^2 + \left[ \frac{d_{AT}(z; \sigma, \varepsilon_r) - d_{AT}^{OBS}(z)}{\Delta_{AT}} \right]^2 \right\} \quad (11)$$

$$\mathcal{L}_P(\sigma, \varepsilon_r) = -\int_{-\infty}^{\infty} dz \frac{\sigma(z)}{T_\sigma}\left[\ln\frac{\sigma(z)}{\sigma_P(z)} - 1\right] - \int_{-\infty}^{\infty} dz \frac{\varepsilon_r(z)}{T_\varepsilon}\left[\ln\frac{\varepsilon_r(z)}{\varepsilon_{r,P}(z)} - 1\right] \quad (12)$$

$$\mathcal{L}_S(\sigma, \varepsilon_r) = \int_{-\infty}^{\infty} dz \left[\frac{d\sigma(z)}{dz}\right]^p + \omega\varepsilon_0 \int dz \left[\frac{d\varepsilon_r(z)}{dz}\right]^p \quad (13)$$

where $\sigma$ and $\varepsilon_r$ represent true conductivity and dielectric constant of the formation to be determined with the inversion. The first term on the right-hand side of Eq. (10) describes how well the simulated data matches the measured data. Here, $d_{PS}^{OBS}$ and $d_{AT}^{OBS}$ represent phase shift and attenuation of propagation measurements corresponding to the coaxial coupling of an electromagnetic propagation tool; $d_{PS}$ and $d_{AT}$ are simulated counterparts of $d_{PS}^{OBS}$ and $d_{AT}^{OBS}$, respectively. $d_{PS}$ and $d_{AT}$ are obtained rapidly with a fast forward solver for the 1D formation. $\Delta_{PS}$ and $\Delta_{AT}$ are standard deviations of data noises for phase shift and attenuation data, respectively. If each datum is an independent random variable, the summation of the squared differences in Eq. (11) obey a $\chi^2$ distribution. The second term of Eq. (10) is given in Eq. (12), which describes the entropy of the conductivity and dielectric models. Here, $T_\sigma$ and $T_\varepsilon$ are the averages of $\sigma$ and $\varepsilon_r$, respectively; $\sigma_P$ and $\varepsilon_{r,P}$ represent the prior models for $\sigma$ and $\varepsilon_r$, respectively. In practice, it is found convenient to let $T_\sigma=\sigma_P$, and $T_\varepsilon=\varepsilon_{r,P}$ in the inversion. The use of the entropy term guides the inversion towards a formation model that maximizes the entropy. The third term of Eq. (10) is given in Eq. (13), which makes the inversion to preferentially look for a smoothing model among all feasible solutions. It is referred to as the smoothness term henceforth.

The exponent p in Eq. (13) can be 1 or 2. When p=2, Eq. (10) has an $L_2$-norm regularization for imposing smoothness on the model. The $L_2$-norm regularization usually works well. However, in some conditions small oscillations can occur on reconstructed resistivity or dielectric constant logs around high-contrast formation discontinuities. This issue can be alleviated by increasing weight $\gamma_S$ for the smoothness term, but at an expense of loss in resolution. The exponent p may therefore by set to 1, leading to an $L_1$-norm smoothness regularization. One merit of this regularization is that it can suppress undesirable small artificial features such as ripples or oscillations on reconstructed logs that may be mistaken for formation signals.

For numerical implementation, the cost function of Eq. (10) is discretized, yielding:

$$\mathcal{L}(m_\sigma, m_\varepsilon) = \chi^2(m_\sigma, m_\varepsilon) - \gamma_P \mathcal{L}_P(m_\sigma, m_\varepsilon) + \gamma_S \mathcal{L}_S(m_\sigma, m_\varepsilon) \quad (14)$$

where $m_\sigma$ and $m_\varepsilon$ represent two N-dimensional vectors of conductivities and dielectric constants of the truncated solution domain $[z_L, z_U]$ after being subdivided into N slabs or pixels with equal thickness, identified by h as shown in FIG. 3. The two vectors are given by $$m_\sigma = (\sigma_1, \sigma_2, \ldots, \sigma_N)^T \quad (15)$$

$$m_\varepsilon = \omega\varepsilon_0(\varepsilon_{r,1}, \varepsilon_{r,2}, \ldots, \varepsilon_{r,N})^T \quad (16)$$

where the superscript T designates the operation of matrix transposition. Note that $m_\varepsilon$ corresponds to the imaginary part of the complex conductivity of Eq. (9). $m_\varepsilon$ is equivalent to the dielectric constant up to $\omega\varepsilon_0$. The discrete forms of the three terms in Eq. (10) are respectively:

$$\chi^2(m_\sigma, m_\varepsilon) = \left\|\bar{W}_{PS}\left[d_{PS}(m_\sigma, m_\varepsilon) - d_{PS}^{OBS}\right]\right\|_2^2 + \left\|\bar{W}_{AT}\left[d_{AT}(m_\sigma, m_\varepsilon) - d_{AT}^{OBS}\right]\right\|_2^2 \quad (17)$$

$$\mathcal{L}_P(m_\sigma, m_\varepsilon) = -\frac{m_\sigma^T}{\sigma_P}\left(\ln\frac{m_\sigma}{\sigma_P} - 1\right) - \frac{m_\varepsilon^T}{\omega\varepsilon_0\varepsilon_{r,P}}\left(\ln\frac{m_\varepsilon}{\omega\varepsilon_0\varepsilon_{r,P}} - 1\right) \quad (18)$$

$$\mathcal{L}_S(m_\sigma, m_E) = \left\|\bar{D}m_\sigma\right\|^p + \left\|\bar{D}m_\varepsilon\right\|^p \quad (19)$$

In Eq. (19), when p=1, the smoothness term is a $L_1$-norm regularization. Otherwise it is $L_2$-norm (when p=2). When the $L_1$-norm regularization is used, a second iterative process (involving additional iteration steps) is necessary to calculate the searching direction at each step of the Gauss-Newton process as described in more detail below (with respect to Eqns. 39-44).

In the above, $d_{PS}^{OBS}$ and $d_{AT}^{OBS}$ represent phase shift and attenuation of the electromagnetic propagation measurements acquired at a plurality M depth points, $$d_{PS}^{OBS}=(d_{PS,1}^{OBS}d_{PS,2}^{OBS}\ldots d_{PS,M}^{OBS})^T \quad (20)$$

$$d_{AT}^{OBS}=(d_{AT,1}^{OBS}d_{AT,2}^{OBS}\ldots d_{AT,M}^{OBS})^T \quad (21)$$

where $d_{PS}$ and $d_{AT}$ represent the phase shift and attenuation of simulated propagation measurements at the same depth points, $$d_{PS}(m_\sigma,m_\varepsilon)=[(d_{PS,1}(m_\sigma,m_\varepsilon)d_{PS,2}(m_\sigma,m_\varepsilon)\ldots d_{PS,M}(m_\sigma,m_\varepsilon)]^T \quad (22)$$

$$d_{AT}(m_\sigma,m_\varepsilon)=[(d_{AT,1}(m_\sigma,m_\varepsilon)d_{AT,2}(m_\sigma,m_\varepsilon)\ldots d_{AT,M}(m_\sigma,m_\varepsilon)]^T \quad (23)$$

In Equation 17, matrices $\overline{W}_{PS}$ and $\overline{W}_{AT}$ are diagonal containing the inverses of standard deviations of the noises of phase shift and attenuation measurements, $$\overline{W}_{PS}=\text{diag}(\Delta_{PS,1}^{-1}\Delta_{PS,2}^{-1}\ldots \Delta_{PS,M}^{-1}) \quad (24)$$

$$\overline{W}_{AT}=\text{diag}(\Delta_{AT,1}^{-1}\Delta_{AT,2}^{-1}\ldots \Delta_{AT,M}^{-1}) \quad (25)$$

In Eq. (18):

$$\ln\frac{m_\sigma}{\sigma_P} = \left(\ln\frac{\sigma_1}{\sigma_P}\ln\frac{\sigma_2}{\sigma_P}\cdots \ln\frac{\sigma_N}{\sigma_P}\right)^T \quad (26)$$

$$\ln\frac{m_\varepsilon}{\omega\varepsilon_0\varepsilon_{r,P}} = \left(\ln\frac{\varepsilon_{r,1}}{\varepsilon_{r,P}}\ln\frac{\varepsilon_{r,2}}{\varepsilon_{r,P}}\cdots \ln\frac{\varepsilon_{r,N}}{\varepsilon_{r,P}}\right)^T \quad (27)$$

and 1 is a constant vector $1=(1\ 1,\ldots 1)^T$.

Matrix $\overline{D}\in R^{(N-1)\times N}$ in Eq. (19) is a difference operator:

$$\overline{D} = \begin{pmatrix} -1 & 1 & & \\ & -1 & 1 & \\ & & \ddots & \\ & & & -1 & 1 \end{pmatrix} \quad (28)$$

A Gauss-Newton method, for example, may be used to minimize the cost function in Eq. (10) to find the best-fit solution for conductivity $m_\sigma$ and dielectric constant $m_\varepsilon$. For the sake of concise formulation, we let:

$$m \equiv (m_\sigma^T\ m_\varepsilon^T)^T \quad (29)$$

$$d \equiv (d_{PS}^T\ d_{AT}^T)^T \quad (30)$$

$$d^{OBS} \equiv \left[(d_{PS}^{OBS})^T\ (d_{AT}^{OBS})^T\right]^T \quad (31)$$

$$\overline{W}_D = \begin{pmatrix} \overline{W}_{PS} & \overline{0} \\ \overline{0} & \overline{W}_{AT} \end{pmatrix} \quad (32)$$

In Eq. (32), $\overline{0}\in R^{M\times M}$ is a zero matrix. Suppose the current iterative step is l, then the solution at this step is $$m_l=m_{l-1}+v_{l-1}q_{l-1} \quad (33)$$

where $q_{l-1}$ represents the Newton search direction and $v_{l-1}$ represents the step length to reduce the effect of approximation error caused by the quadratic approximation at the current step. When p=2, the problem is an $L_2$-norm optimization. The search vector may be expressed as follows:

$$q_{l-1}=-\overline{G}_{l-1}^{-1}g_{l-1} \quad (34)$$

where $g_{l-1}$ represents the gradient of the cost function and $\overline{G}_{l-1}$ represents its Hessian. They may be expressed as follows:

$$g_{l-1}=J_{l-1}^T\overline{W}_D^T\overline{W}_D(d_{l-1}-d^{OBS})+\gamma_P^{l-1}\nabla\mathcal{L}_P(m_{l-1})+\gamma_S^{l-1}\nabla\mathcal{L}_S(m_{l-1}) \quad (35)$$

$$\overline{G}_{l-1}=J_{l-1}^T\overline{W}_D^T\overline{W}_DJ_{l-1}+\gamma_P^{l-1}\nabla\nabla\mathcal{L}_P(m_{l-1})+\gamma_S^{l-1}\nabla\nabla\mathcal{L}_S(m_{l-1}) \quad (36)$$

In Eqns. 35 and 36, $d_{l-1}$ represents simulated data corresponding to the model $m_{l-1}$ obtained at the previous step; $J_{l-1}$ is the Jacobian of the data term $\chi^2$ of the cost function, evaluated at $m=m_{l-1}$. $\nabla\mathcal{L}_P$ and $\nabla\mathcal{L}_S$ are the gradients of the maximum entropy and the smoothness terms in Eq. (10), respectively. $\nabla\nabla\mathcal{L}_P$ and $\nabla\nabla\mathcal{L}_S$ are their Hessians, respectively. The exact forms of these four gradients and Hessians are readily derived from $\mathcal{L}_P$ and $\mathcal{L}_S$ in Eqns. (18) and (19). The two regularization parameters, $\gamma_P$ and $\gamma_S$, are dynamically adjusted with $\chi^2$ during the iteration such that $$\gamma_P^{l-1}=\delta_P\chi^2(m_{l-1}) \quad (37)$$

$$\gamma_S^{l-1}=\delta_S\chi^2(m_{l-1}) \quad (38)$$

where $\chi^2(m_{l-1})$ represents the data misfit evaluated at $m=m_{l-1}$, the model obtained at the previous step. Numerical experiments show that setting $\delta_P$ and $\delta_S$ to 1 is an appropriate choice for both synthetic and field data processing. Once the search direction is determined from Eq. (34), a linear search follows to determine the step length $v_{l-1}$.

When p=1, the problem is partially an $L_1$-norm optimization because of the $L_1$-norm smoothness term. The searching direction $q_{l-1}$ can be found with an iterative solver. As a result, at the k-th iterative step, $q_{l-1}$ is given by $$q_{l-1}^{(k+1)}=-\{\overline{G}_{l-1}^{p,(k)}\}^{-1}g_{l-1}^{p,(k)} \quad (39)$$

where $g_{l-1}^{p,(k)}$ represents the gradient of the cost function at k-th iterative step and $\overline{G}_{l-1}^{p,(k)}$ is its Hessian, $$g_{l-1}^{p,(k)}=J_{l-1}^T\overline{W}_D^T\overline{W}_D(d_{l-1}-d^{OBS})+\gamma_P^{l-1}\nabla\mathcal{L}_P(m_{l-1})+\gamma_S^{l-1}\nabla\mathcal{L}_S^{p,(k)}(m_{l-1}) \quad (40)$$

$$\overline{G}_{l-1}^{p,(k)}=J_{l-1}^T\overline{W}_D^T\overline{W}_DJ_{l-1}+\gamma_P^{l-1}\nabla\nabla\mathcal{L}_P(m_{l-1})+\gamma_S^{l-1}\nabla\nabla\mathcal{L}_S^{p,(k)}(m_{l-1}) \quad (41)$$

In the above, $\mathcal{L}_S^{p,(k)}(m_{l-1})$ is the modified smoothness term, $$\mathcal{L}_S^{p,(k)}(m_{l-1})=\|\overline{W}_\sigma^{(k),1/2}\overline{D}(m_{\sigma,l-1}+q_\sigma^{(k+1)})\|_2^2+\|\overline{W}_\varepsilon^{(k),1/2}\overline{D}(m_{\varepsilon,l-1}+q_\varepsilon^{(k+1)})\|_2^2 \quad (42)$$

where $\overline{W}_\sigma^{(k)}$ and $\overline{W}_\varepsilon^{(k)}$ are both diagonal matrices. Their j-th diagonal elements may be found with based on the following expression.

$$\overline{W}_\sigma^{(k)}=\{\overline{D}(m_{\sigma,l-1}+q_\sigma^{(k)})\}_j \quad (43)$$

$$\overline{W}_\varepsilon^{(k)}=\{\overline{D}(m_{\varepsilon,l-1}+q_\varepsilon^{(k)})\}_j \quad (43)$$

With reference back to Eqns. (35) and (36), Jacobian $J_{l-1}\in R^{2M\times 2N}$ contains the first derivatives of $d_{PS}$ and $d_{AT}$ with respect to pixel conductivities and dielectric constants, evaluated at $m=m_{l-1}$. It may be expressed mathematically, for example, as follows:

$$J_{l-1} = \begin{pmatrix} \frac{\partial d_{PS}}{\partial m_\sigma} & \frac{\partial d_{PS}}{\partial m_\varepsilon} \\ \frac{\partial d_{AT}}{\partial m_\sigma} & \frac{\partial d_{AT}}{\partial m_\varepsilon} \end{pmatrix}\bigg|_{m=m_{l-1}} \text{ where} \quad (45)$$

$$\frac{\partial d_\eta}{\partial x} = \begin{pmatrix} \frac{\partial d_{\eta,1}}{\partial x_1} & \frac{\partial d_{\eta,1}}{\partial x_2} & \cdots & \frac{\partial d_{\eta,1}}{\partial x_N} \\ \frac{\partial d_{\eta,2}}{\partial x_1} & \frac{\partial d_{\eta,2}}{\partial x_2} & \cdots & \frac{\partial d_{\eta,2}}{\partial x_N} \\ \vdots & \vdots & \ddots & \vdots \\ \frac{\partial d_{\eta,M}}{\partial x_1} & \frac{\partial d_{\eta,M}}{\partial x_2} & \cdots & \frac{\partial d_{\eta,M}}{\partial x_N} \end{pmatrix}, \eta=PS, AT; x=m_\sigma, m_\varepsilon \quad (46)$$

Derivatives of $d_{PS}$ and $d_{AT}$ with respect to conductivities of pixels may be computed either with an analytical approach or using a finite difference approximation. Instead of computing them directly, derivatives with respect to dielectric constants are derived from those with respect to conductivities. Making using of the Born's approximation, we obtain the following relationships for derivatives of phase shift and attenuation measurements:

$$\frac{1}{\omega \varepsilon_0} \frac{\partial d_{PS,j}}{\partial \varepsilon_{r,k}} = \frac{\partial d_{AT,j}}{\partial \sigma_k} \qquad (47)$$

$$\frac{1}{\omega \varepsilon_0} \frac{\partial d_{AT,j}}{\partial \varepsilon_{r,k}} = -\frac{\partial d_{PS,j}}{\partial \sigma_k} \qquad (48)$$

for phase shift and attenuation data at the j-th depth point and conductivity and dielectric constant of pixel k. It is noted that Eqns. (47) and (48) are true only for phase shift and attenuation before being converted to the unit of decibels and degrees. For an elemental propagation tool composed of one transmitter T and two receivers R1 and R2, $d_{PS}=\text{Im}\{\ln(V_1 V_2)\}=\text{Im}\{\ln V_1 - \ln V_2\}$ and $d_{AT}=\text{Re}\{\ln(V_1/V_2)\}=\text{Re}\{\ln V_1 - \ln V_2\}$. Here, V1 and V2 represent voltages at the near receiver R1 and far receiver R2, respectively when electromagnetically coupled with transmitter T at a propagation frequency.

Given a voltage $V=V_R + iV_X$, it can be shown that the derivative of ln V with respect to a parameter u ($\sigma$ or $\varepsilon$) can be found with the following relationships:

$$\frac{\partial}{\partial u} \text{Re}\{\ln V\} = \frac{1}{V_R^2 + V_X^2} \left( V_R \frac{\partial V_R}{\partial u} + V_X \frac{\partial V_X}{\partial u} \right), u = \sigma, \varepsilon \qquad (49)$$

$$\frac{\partial}{\partial u} \text{Im}\{\ln V\} = \frac{1}{V_R^2 + V_X^2} \left( V_R \frac{\partial V_X}{\partial u} - V_X \frac{\partial V_R}{\partial u} \right), u = \sigma, \varepsilon \qquad (50)$$

Given the derivatives of voltages $V_1$ and $V_2$, the above equations may be used to compute the derivatives of $d_{PS}$ and $d_{AT}$ with respect to $\sigma$ or $\varepsilon$. Eqns. (47) and (48) may be written in vector form as $$\frac{\partial d_{PS}}{\partial m_\varepsilon} = \frac{\partial d_{AT}}{\partial m_\sigma} \qquad (51)$$

$$\frac{\partial d_{AT}}{\partial m_\varepsilon} = -\frac{\partial d_{PS}}{\partial m_\sigma} \qquad (52)$$

Substituting Eqns. (51) and (52) into Eq. (45) yields $$J_{l-1} = \begin{pmatrix} \frac{\partial d_{PS}}{\partial m_\sigma} & \frac{\partial d_{AT}}{\partial m_\sigma} \\ \frac{\partial d_{AT}}{\partial m_\sigma} & \frac{\partial d_{PS}}{\partial m_\sigma} \end{pmatrix} \bigg|_{m = m_{l-1}} \qquad (53)$$

The use of the Jacobian in Eq. (53) expedites the inversion by nearly a factor of two compared to using the Jacobian in Eq. (45).

The stopping criteria for the inversion are $\chi^2 < M_f$ and $l > l_{max}$, where $l$ is the index for iteration step. $M_f$ is the number of degrees of freedom, $M_f = 2M$ if all data are independent random variables. In the inversion $l_{max}$, the maximum number of iterations, is set to 50.

Figure 4A:
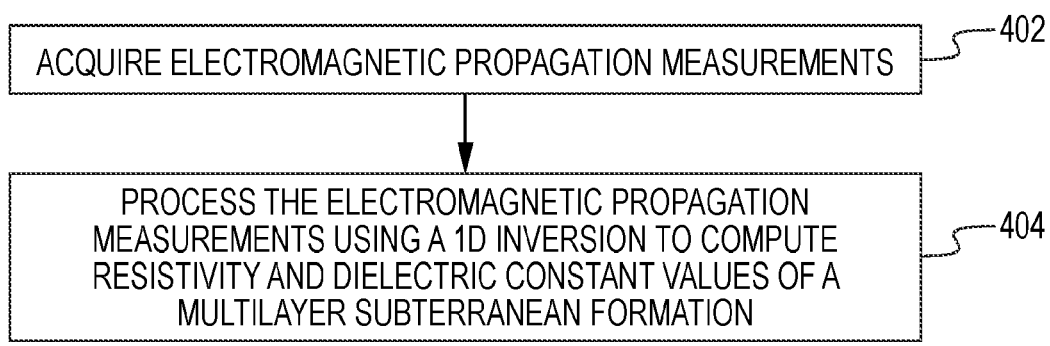
FIG. 4A depicts a flowchart of one example method embodiment for estimating resistivity and dielectric constant values of a multi-layer subterranean formation.

FIG. 4A depicts a flow chart of one example method embodiment. In the depicted embodiment, electromagnetic propagation measurements are received at 402. The measurements may be received, for example, from an electromagnetic propagation tool that was used to make the measurements while translating along an axis of a subterranean wellbore. The received measurements are then processed at 404 via an inversion algorithm using a one-dimensional formation model including a plurality of formation layers to compute resistivity and dielectric constant values of each of the plurality of formation layers to compute resistivity and dielectric constant values corresponding to each of the formation layers in the model.

Figure 4B:
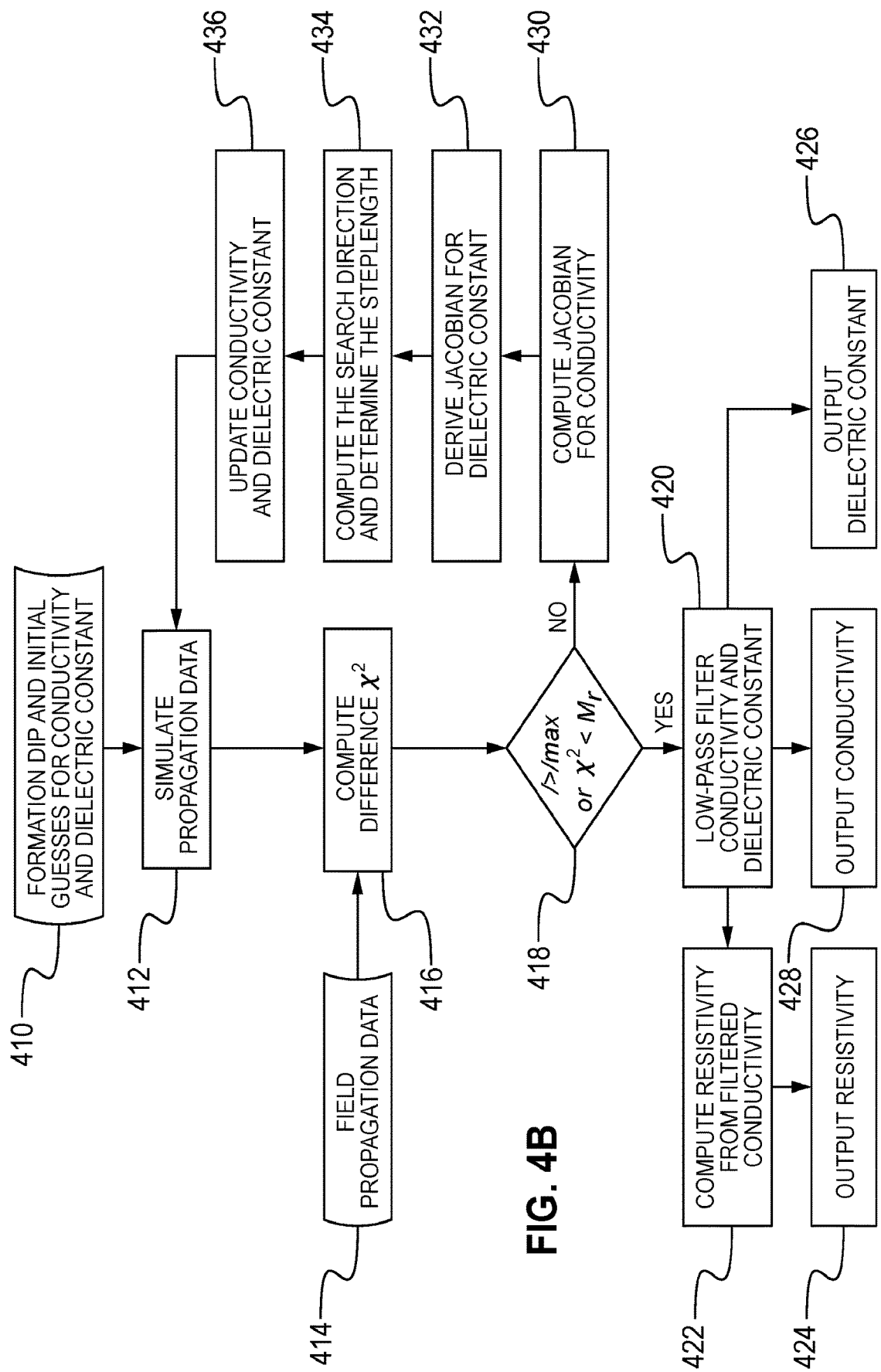
FIG. 4B depicts a more detailed flow chart of a method for conducting an inversion process depicted on FIG. 4A.

FIG. 4B depicts a more detailed flow chart of a method for conducting the inversion (e.g., process step 404 in FIG. 4A). The process includes providing a formation dip and initial guesses for conductivity and dielectric constant at 410. Propagation measurements are simulated at 412. Electromagnetic propagation measurements are provided at 414 and processed in combination with the simulated measurements to compute a difference $\chi^2$ at 416 between the simulated propagation data and field propagation data. The stopping criteria (described above) are then evaluated at 418 to determine if $l > l_{max}$ or $\chi^2 < M_f$.

When the stopping criteria are satisfied at 418 a low-pass filter is applied to the conductivity and dielectric constant values at 420. The filtered values are then processed to compute resistivity values at 422 which may be output at 424. The filtered dielectric constant and conductivity values may also be output at 426 and 428. When the stopping criteria are not satisfied, the inversion processing loops back, computing the Jacobian for conductivity at 430, deriving the Jacobian for the dielectric constant computing the search direction and determining the step length 434, and updating the conductivity and dielectric constant values at 436.

In practice, some variants can be derived from the formulation in the above to further enhance the performance of the inversion. For instance, instead of inverting for $\sigma$ and $\varepsilon_r$, one may choose to invert for the logarithms of $\sigma$ and $\omega \varepsilon_0 \varepsilon_r$. To accommodate the transforms, the maximum entropy term in Eq. (12) may be modified as follows:

$$\mathcal{L}_P(\sigma, \varepsilon_r) = -\int_{-\infty}^{\infty} dz \frac{\ln \sigma(z) + \gamma_\sigma}{\ln T_\sigma + \gamma_\sigma} \left[ \ln \frac{\ln \sigma(z) + \gamma_\sigma}{\ln \sigma_P(z) + \gamma_\sigma} - 1 \right] - \qquad (54)$$

$$\int_{-\infty}^{\infty} dz \frac{\ln \varepsilon_r(z) + \gamma_\varepsilon}{\ln T_\varepsilon + \gamma_\varepsilon} \left[ \ln \frac{\ln \varepsilon_r(z) + \gamma_\varepsilon}{\ln \varepsilon_{r,P}(z) + \gamma_\varepsilon} - 1 \right]$$

where $\gamma_\sigma$ and $\gamma_\varepsilon$ are positive numbers that prevent the denominators from being vanishingly small. The smoothness term in Eq. (13) may be modified as follows:

$$\mathcal{L}_S(\sigma, \varepsilon_r) = \int_{-\infty}^{\infty} dz \left[ \frac{d \ln \sigma(z)}{dz} \right]^p + \int dz \left[ \frac{d \ln \varepsilon_r(z)}{dz} \right]^p \qquad (55)$$

where the exponent p may be 1 or 2.

Another variant is using phase shift and attenuation resistivity logs instead of phase shift and attenuation data directly. Phase shift and attenuation resistivity logs can be used directly in the inversion. Alternatively, they can be transformed back to phase shift and attenuation using the inverse of the resistivity transform.

Yet another variant is extension of the approach to determining anisotropic conductivity and dielectric constant. One popular anisotropic model is a transversely isotropic (TI) model. In a TI model, the conductivity is characterized by horizontal conductivity $\sigma_h$ and vertical conductivity $\sigma_v$. The dielectric constant is characterized by horizontal dielectric constant $\varepsilon_{h,r}$ and vertical dielectric constant $\varepsilon_{v,r}$. Here, $\sigma_h$ and $\varepsilon_{h,r}$ are conductivity and dielectric constant in the direction parallel to the bedding planes; $\sigma_v$ and $\varepsilon_{v,r}$ are those in the direction normal to the bedding planes. Depending on the data used in the inversion, formation dip $\theta$ and azimuth $\phi$ may be added to the unknowns of the inversion. For instance, Periscope data may be used to determine $\sigma_h$, $\sigma_v$, $\varepsilon_{h,r}$, $\varepsilon_{v,r}$, dip $\theta$ and azimuth $\phi$ simultaneously.

To facilitate numerical implementation, if a zone to be processed is long, the zone is first subdivided into a sequence of short intervals. Then the inversion is run on each interval separately. The results of all intervals are then combined to obtain a single output. One realization of this divide and conquer scheme is: each interval is 30 feet with a transition zone of 25 ft on both sides. The relative dip $\theta$, or the angle made by the tool axis and the normal to the bedding planes is assumed to be already known and therefore is fixed in the inversion. It can be obtained with borehole image data or some advanced electromagnetic measurements, e.g. Periscope data. Upon output, $\sigma$ and $\varepsilon_r$ that are obtained at the last iteration of the inversion are low-pass filtered to remove undesirable spikes before being used as the final solution. We use a Gaussian filter with a standard deviation of 0.35 feet as the low pass filter. In addition to $\sigma$, resistivity is also provided as a reciprocal of the filtered conductivity, denoted as R. $\sigma$ and R reflect the collective effect of formation and conductive additions such as metallic particles. $\sigma$ and $\varepsilon_r$ give the true formation conductivity and dielectric constant free of bed boundary and dipping effects up to the tool resolution. Moreover, there are no skin effect and no distortion in $\sigma$ and R caused by the dielectric constant, which are already corrected in the inversion together with the bed boundary and dipping effects.

The disclosed embodiments are now described in more detail with respect to the following non-limiting examples, including field cases, to demonstrate advantageous performance of the disclosed embodiments.

The Oklahoma model can be used to test the performance of inversion methods. The $L_2$-norm smoothness term (p=2) is used for regularization in the tests using the Oklahoma model. The model is described in detail in Table 1. The positions of bed boundaries are defined on true formation thickness (TFT), or the depth along the normal to the bedding planes in the tool coordinates. The dielectric constant model given in Table 1 is what can be used for some tools, other tools may have a dielectric constant larger than the example table shown by 5 or some other magnitude, one skilled in the art with the aid of this disclosure would know magnitude of the dielectric constant to use.

TABLE 1

The modified Oklahoma model

| No. | z (ft) | R (ohm · m) | $\varepsilon_r$ |
|---|---|---|---|
| 1 | 0 | 1 | 108.5 |
| 2 | 17 | 10 | 48.6 |
| 3 | 25 | 0.4 | 149.4 |
| 4 | 29 | 3 | 73.9 |
| 5 | 32 | 0.9 | 112.6 |
| 6 | 39 | 20 | 38.1 |
| 7 | 43 | 0.7 | 122.9 |
| 8 | 49 | 90 | 22.6 |

TABLE 1-continued

The modified Oklahoma model

| No. | z (ft) | R (ohm · m) | $\varepsilon_r$ |
|---|---|---|---|
| 9 | 52 | 6 | 58.1 |
| 10 | 57 | 120 | 20.4 |
| 11 | 64 | 4 | 66.9 |
| 12 | 82 | 150 | 18.9 |
| 13 | 90 | 40 | 29.9 |
| 14 | 97 | 1.5 | 94.2 |
| 15 | 107 | 100 | 21.7 |
| 16 | 111 | 18 | 39.6 |
| 17 | 116 | 100 | 21.7 |
| 18 | 119 | 1.5 | 94.2 |
| 19 | 123 | 7.5 | 53.7 |
| 20 | 127 | 0.9 | 112.6 |
| 21 | 131 | 2 | 85.2 |
| 22 | 136 | 10 | 48.6 |
| 23 | 139 | 1.8 | 88.4 |
| 24 | 141 | 20 | 38.1 |
| 25 | 143 | 7.5 | 53.7 |
| 26 | 145 | 15 | 42.2 |
| 27 | 157 | 0.7 | 122.9 |
| 28 | ∞ | 1.1 | 104.9 |

Figure 5:
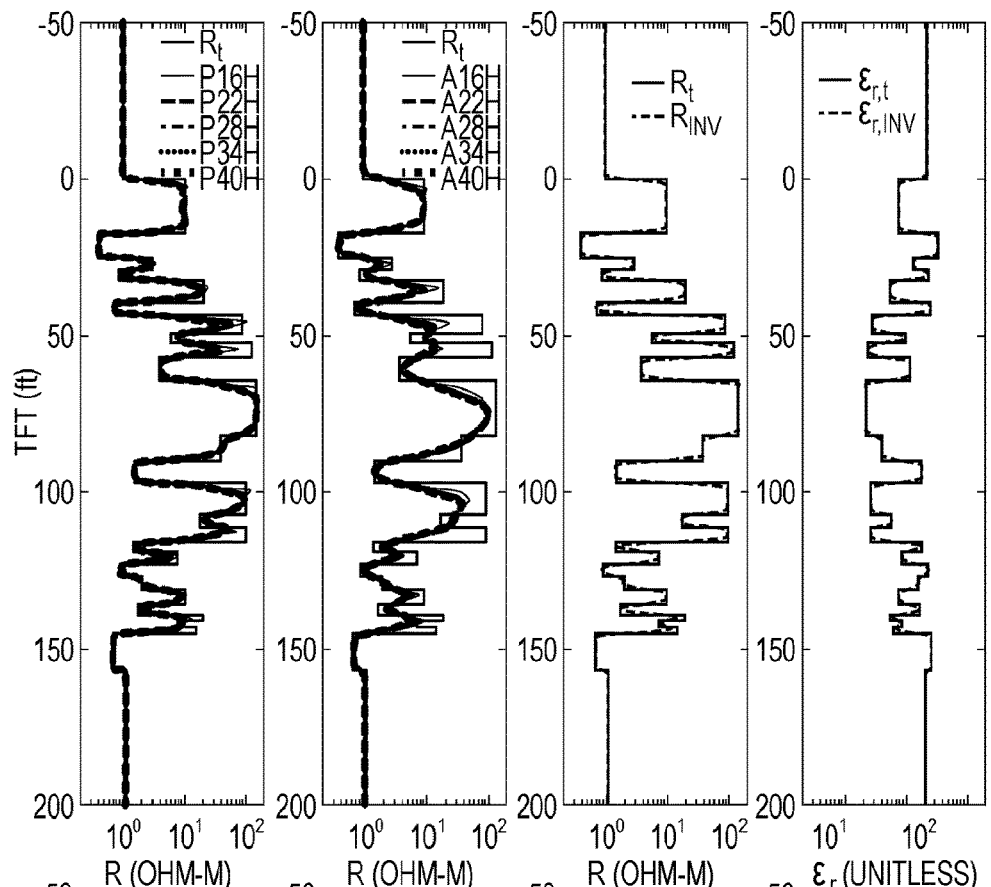
FIG. 5 depicts example plots of resistivity and dielectric constant values (right two tracks) versus true formation thickness (TFT) obtained via inversion of the 40 inch EcoScope phase shift and attenuation data at 2 MHz in the Oklahoma model of a relative dip of 0 degrees.

In the first case, the relative dip of the modified Oklahoma model is 0 degree. The dip is given to the inversion as a known parameter and is fixed in the inversion. The 40 in. EcoScope phase shift and attenuation data at 2 MHz are used in the inversion as measurements. The resistivity R and dielectric constant $\varepsilon_r$ obtained with the inversion are displayed in the right two tracks in FIG. 5. The 2 MHz phase shift and attenuation resistivity logs are displayed in left two tracks as reference. The black square logs in tracks 1-3 from left are the true resistivity of the formation. The black square log in the right-most track is the true dielectric constant of the formation. Both the resistivity and dielectric constant logs obtained with the inversion can resolve the three thin layers located below 139 ft. and above 145 ft. In contrast, they are undesirably blurred on phase shift and attenuation resistivity logs. Above 139 ft, the inversion-derived resistivity log is nearly the same as the true resistivity at the middle of each bed. In contrast, phase shift resistivity logs, which have higher resolution than attenuation resistivity logs, read consistently lower than the true resistivity when the bed is less than 5 ft. Comparison of the inversion-derived resistivity and dielectric constant shows the dielectric constant log has similar resolution as the resistivity log.

Figure 6:
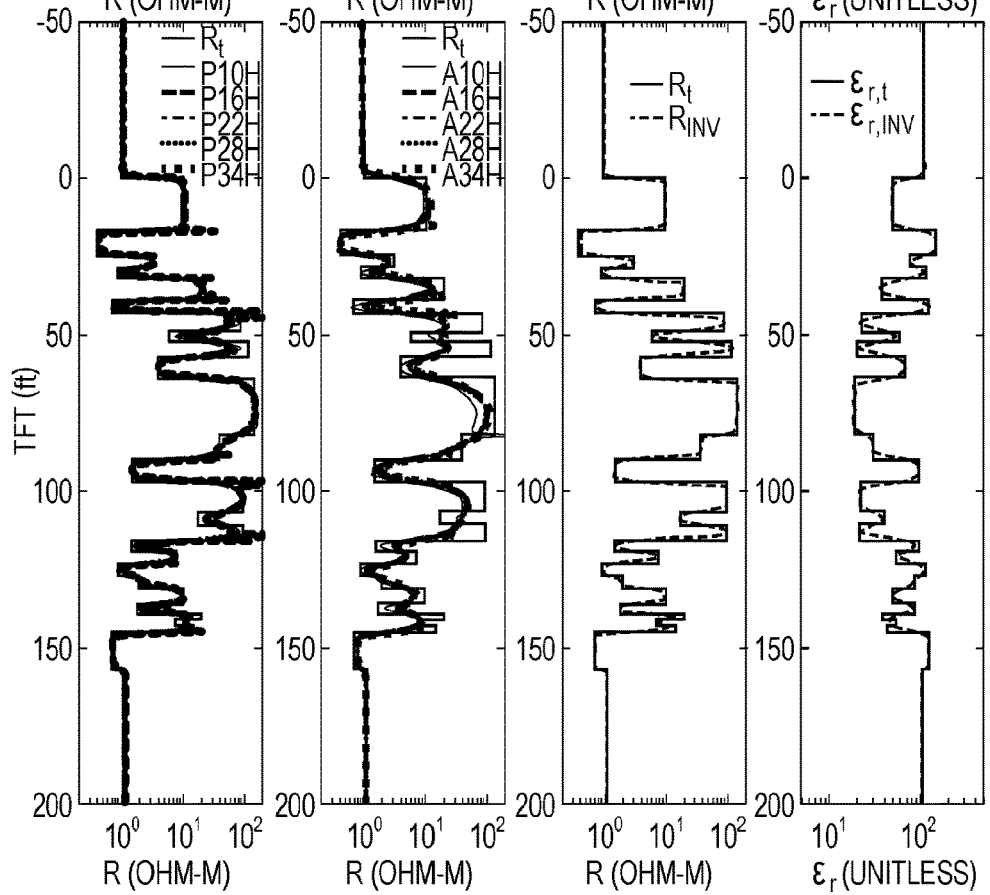
FIG. 6 depicts example plots of resistivity and dielectric constant values (right two tracks) versus true formation thickness (TFT) obtained via inversion of the 40 inch EcoScope phase shift and attenuation data at 2 MHz in the Oklahoma model of a relative dip of 60 degrees.

In a second example, the relative dip of the modified Oklahoma model is increased to 60 degree. The 34 in ARC phase shift and attenuation data at 2 MHz are used in the inversion as measurements. As in the previous example, the dip is given to the inversion as a known parameter and is fixed in the inversion. The results are displayed in FIG. 6. The layout of FIG. 6 is the same as FIG. 5. Comparison of the inversion-derived resistivity R and dielectric constant $\varepsilon_r$ shows that the resolution of the resistivity log is slightly better than that of the dielectric constant log. The dielectric constant log fails to resolve the three thin layers in the interval from 139 ft to 145 ft, whereas the three layers can still be delineated on the resistivity log. The phase shift and attenuation resistivity logs are strongly affected by the dipping and bed boundary effects. Polarization horns can be seen around some bed boundaries on both phase shift and attenuation resistivity logs. In contrast, the inversion-derived resistivity R and dielectric constant $\varepsilon_r$ are free of dipping and bed boundary effect.

Two field examples follow in which electromagnetic propagation measurements are processed using the one 1D inversion methodology described above. The $L_1$-norm smoothness term (p=1) is used for regularization in both examples. The wellbore where the electromagnetic propagation measurements were acquired was drilled with water-based drilling fluid having a mud resistivity of 0.02 ohm·m at bottom hole temperature. The bit size was 8.5 inches and the hole deviation was 1-2 degrees from top to bottom. Mineral analysis with elemental spectroscopy logs in the lower section showed that the formation included primarily limestone, dolomite, and anhydrite.

Figure 7:
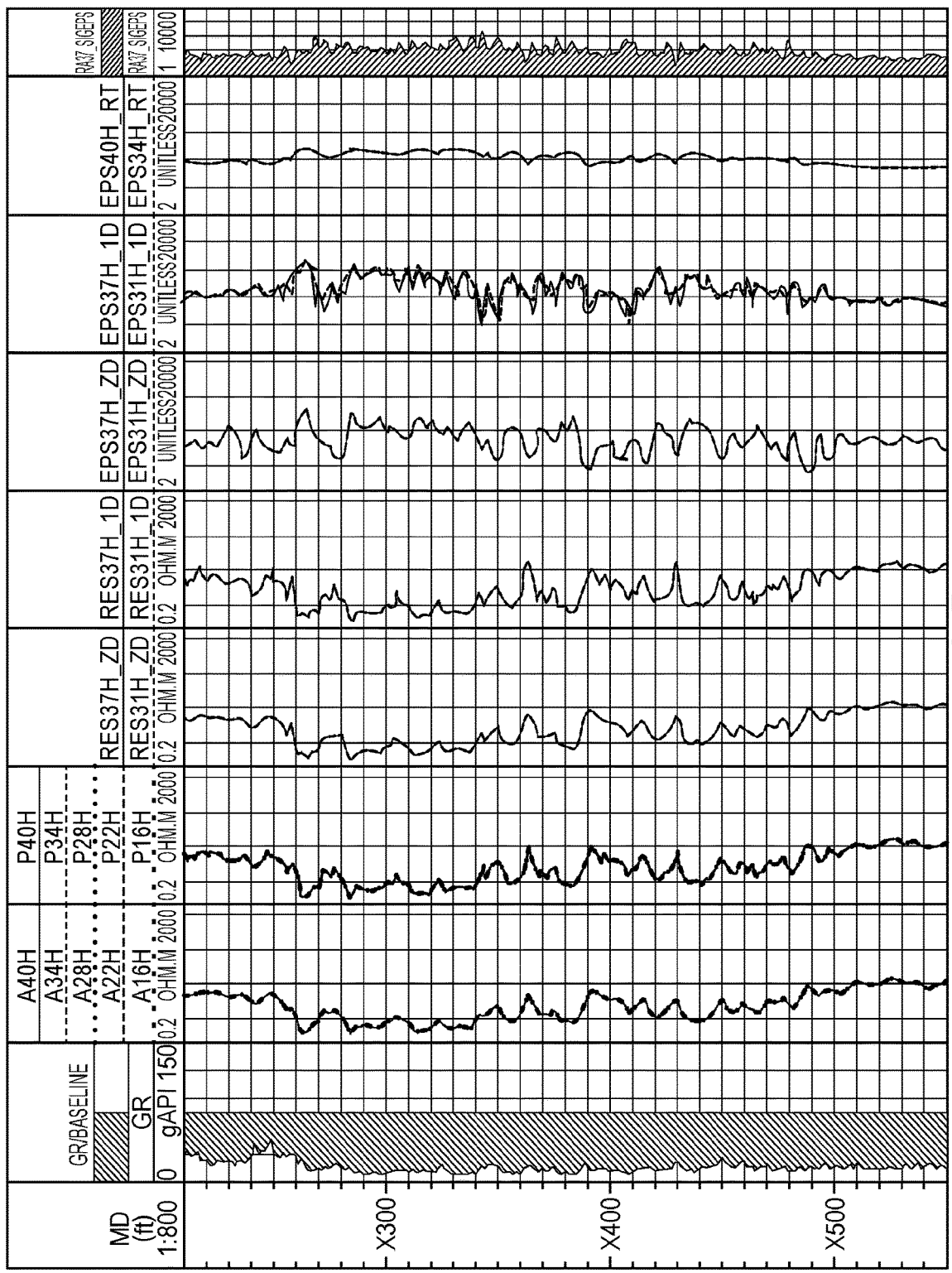
FIG. 7 depicts example logs of plots of resistivity and dielectric constant values versus measured depth obtained using the disclosed 1D inversion method.

The ratio of real conductivity (SIG37H) over the product of $\omega\varepsilon_0$ and EPS37H shown in track 10 (the rightmost track) of FIG. 7 serves as a quality indicator for dielectric logs. Dielectric information is contained in $\omega\varepsilon_0\varepsilon_r$, the imaginary part of complex conductivity $\tilde{\sigma}=\sigma-i\omega\varepsilon_0\varepsilon_r$. The relative magnitude of $\omega\varepsilon_0\varepsilon_r$ relative to $\sigma$ is an indicator of the reliability of $\varepsilon_r$ values determined from electromagnetic measurements. In certain operations a ratio of $\sigma/\omega\varepsilon_0\varepsilon_r<10$ may be a reasonable requirement indicating a quantitatively useful dielectric constant measurement. This is in addition to the condition of $\varepsilon_r>10$, at which dielectric effect becomes measurable at 2 MHz frequency. FIG. 7, track 10 shows that in this section, the ratio of $\sigma/\omega\varepsilon_0\varepsilon_r$ is mostly between 20-50. Therefore, the depicted dielectric logs likely have a high level of uncertainty regardless of the underlying inversion invoked for determining dielectric constant.

Track 7 of FIG. 7 displays dielectric constant logs computed with a ZD (zero-dimensional) inversion that assumes a homogeneous formation. It is known that attenuation has lower resolution than phase shift resistivity. As a result, attenuation and phase shift logs can cross over at bed boundaries in an interval of multiple thin beds with a resistivity alternating between high and low values. The mismatch of resolution between attenuation and phase shift logs may cause some artifacts on ZD dielectric logs. Applying a low-pass filter can alleviate this adverse effect at the cost of degrading vertical resolution. A Gaussian filter having a window size of 5 ft. was applied to the dielectric logs in track 7.

The dielectric constant logs track 8 were computed using the 1D inversion methodology described above. As described above, the bed boundaries are part of the formation model used in the 1D inversion. Therefore, any difference between attenuation and phase shift logs caused by resistivity contrast or bed boundaries may be identified and attributed properly to bed boundaries instead of being taken as from the dielectric effect. On the other hand, because the ratio of $\sigma/\omega\varepsilon_0\varepsilon_r$ is 20-50 in this section, it should be understood that dielectric logs may carry a relatively large uncertainty. Caution should be exercised when interpreting dielectric logs in individual beds.

Track 9 depicts dielectric constant logs obtained using the resistivity transform for 34- and 40-inch arrays. These two arrays have the deepest depth of investigation (DOI) the propagation tool measures, which are comparable to those of EPS31H and EPS37H. The dielectric assumption used in the resistivity transform is based on laboratory measurements of rock samples. Therefore, the resistivity-transform dielectric constant is expected to give a reasonable estimate of actual formation dielectric constant.

The dielectric logs from the resistivity transform are largely inversely proportional to resistivity in the logarithmic scale. Dielectric logs of the 1D inversion follow the same general trend. In other words, dielectric constant tends to be small where resistivity is high, and it tends to increase where the resistivity is low. In the zone displayed in FIG. 7, the dielectric constant logs from the resistivity transform and those of the 1D inversion appear to be in good agreement as far as the baseline magnitude and the general trend are concerned.

Figure 8:
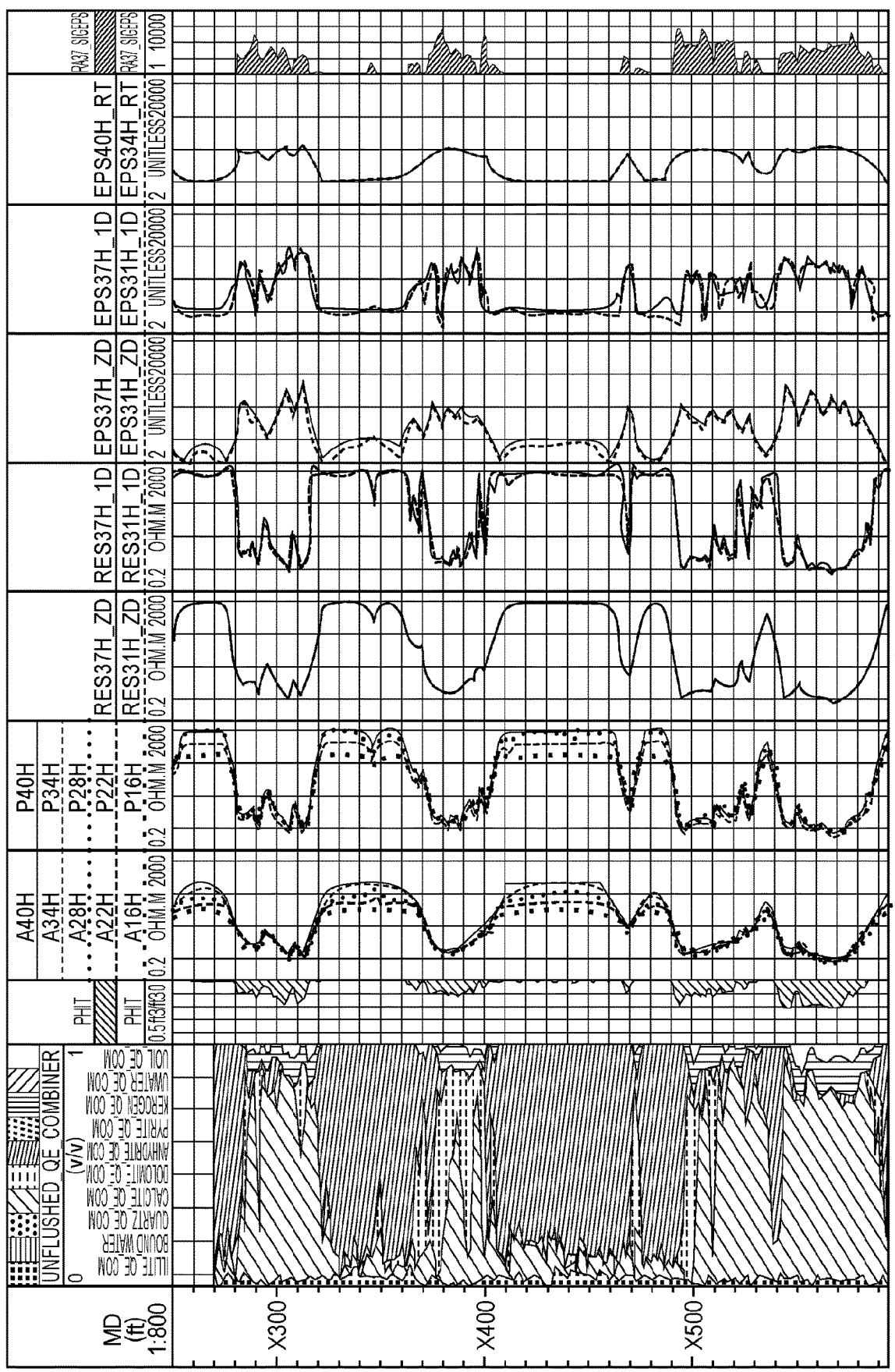
FIG. 8 depicts example logs of plots of resistivity and dielectric constant values versus measured depth obtained using the disclosed 1D inversion method for a lower section of the same well in which the logs depicted on FIG. 7 were generated.

A second log is depicted in FIG. 8 for a lower section of the same well as depicted on FIG. 7. The layout of the log is identical to that described above with respect to FIG. 7 with the exception that a mineral and a porosity track are inserted between the depth track and the attenuation resistivity track. Mineral components from the elemental spectroscopy data shed light on the lithology in this zone. Two leading types of rock are limestone and dolomite, identified by grey and dark grey color. There is also anhydrite in the zone, identified by dark pink color in track 3. Massive evaporite beds of anhydrite like these are generally not porous. Their true resistivity is likely in the range of 50,000 ohm·m to infinity, in line with high readings of phase shift and attenuation logs. In contrast, resistivity of limestone and dolomite beds is significantly low, with readings mostly between 1 and 10 ohm·m. In addition, the fluid in these beds appears to contain more water than oil.

The dielectric logs obtained using the above described 1D inversion in the third track from right appear to have a gross correlation with resistivity. With only mineral components, it is not clear whether it has some level of correlation with water saturation. The resistivity-transform dielectric constant logs are given in the second track from right as reference. The two sets of dielectric logs compare well with each other as far as the general trend is concerned. In addition, the 1D inversion dielectric logs read higher than the resistivity-derived dielectric logs in the limestone and dolomite reservoirs. The rightmost track shows that the ratio of $\sigma/\omega\varepsilon_0\varepsilon_r$ is mostly 10-100 in this section, indicating a high level of uncertainty in dielectric constant. Therefore, we emphasize that fine features on the 1D dielectric constant logs may not be well representative of actual variation of formation dielectric constant.

Dielectric logs obtained with the ZD inversion (assuming a homogeneous formation) are in the fourth track from right The low-pass filtered ZD dielectric logs appear to correlate well with the 1D logs but show a lower resolution than the latter.

The other outputs of the 1D inversion are resistivity logs that compare favorably with the standard attenuation and phase-shift resistivity logs in this zone. In general, the 1D resistivity logs of the disclosed embodiments are distinctly sharper than the two standard logs where the resistivity contrast is high from bed to bed. This happens between permeable carbonates (limestone and dolomite) and tight anhydrite beds. Comparatively, both attenuation and phase shift logs change slowly from low-resistivity carbonates to high-resistivity anhydrite. The slow variation is presumably due to the fact that the eddy current in conductive shoulder beds is so strong that the tool can still sense its effect after already entering the resistive bed. Such reasoning may also explain why the conductive stringer at X470 appears thick as opposed to the same bed on the 1D resistivity logs. Likewise, the low resistivity value of the thin anhydrite bed at X530-540 may also be attributed to the influence of the conductive shoulder beds. On the 1D resistivity logs, the resistivity of the thin anhydrite bed is nearly the same as in the two thick anhydrite beds.

It will be appreciated that resolution-enhanced resistivity logs of the 1D inversion may serve two purposes: (i) resistivity logs can be used to delineate the formation and ii) resistivity logs can also be used as a measurement of true formation resistivity in place of standard resistivity logs. This results from the fact that resistivity logs of the 1D inversion are largely free of bed boundary and dielectric effects. This is especially true for low-dip formations. These effects are parasitic in standard resistivity logs, causing these logs to behave in a strange manner in many situations.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A method for estimating resistivity and dielectric constant values of a subterranean formation, the method comprising:
    acquiring electromagnetic propagation measurements of the subterranean formation; and
    processing the electromagnetic propagation measurements via inversion using a one-dimensional formation model including a plurality of formation layers to compute resistivity and dielectric constant values of each of the plurality of formation layers,
    wherein the electromagnetic propagation measurements are inverted via minimizing a cost function comprising a misfit term, an entropy term, and a smoothing term, and
    wherein the misfit term, the entropy term, and the smoothing term are each dependent on the resistivity and the dielectric constant values of each of the plurality of formation layers.

2. The method of claim 1, wherein the acquiring electromagnetic propagation measurements comprises:
    translating an electromagnetic propagation tool along an axis of a wellbore; and
    causing the electromagnetic propagation tool to make a plurality of electromagnetic measurements at a plurality of measured depths while translating in the wellbore.

3. The method of claim 1, wherein the electromagnetic propagation measurements are made at one or more frequencies in a range from about 200 kHz to about 4 MHz.

4. The method of claim 1, wherein the electromagnetic propagation measurements comprise attenuation and phase shift measurements.

5. The method of claim 1, wherein the processing comprises computing partial derivatives of a phase shift and an attenuation of simulated electromagnetic propagation measurements with respect to conductivity and dielectric constant of the plurality of formation layers.

6. The method of claim 5, wherein the computing the partial derivatives comprises computing a partial derivative of a natural log of a real portion of an acquired voltage measurement with respect to the conductivity and the dielectric constant of the plurality of formation layers and a partial derivative of a natural log of an imaginary portion of an acquired voltage measurement with respect to the conductivity and the dielectric constant of the plurality of formation layers.

7. The method of claim 1, wherein the cost function is a discretized relation depending on the conductivity and the dielectric constant values of each of the plurality of formation layers.

8. The method of claim 1, wherein the minimizing the cost function comprises an L1-norm regularization of the smoothing term.

9. The method of claim 8, wherein the L1-norm regularization of the smoothing term comprises an iterative process to compute a searching direction at each step of a Gauss-Newton process.

10. A system comprising:
    a downhole electromagnetic logging tool configured to make a plurality of electromagnetic propagation measurements of a subterranean formation;
    a processor; and
    memory storing instructions configured to be executed by the processor, the instructions comprising instructions to:
        receive the electromagnetic propagation measurements made by the downhole electromagnetic logging tool; and
        process the electromagnetic propagation measurements via inversion using a one-dimensional formation model including a plurality of formation layers to compute resistivity and dielectric constant values of each of the plurality of formation layers,
        wherein the electromagnetic propagation measurements are inverted via minimizing a cost function comprising a misfit term, an entropy term, and a smoothing term, and
        wherein the misfit term, the entropy term, and the smoothing term are each dependent on the conductivity and the dielectric constant vales of each of the plurality of formation layers.

11. The system of claim 10, wherein the downhole electromagnetic logging tool is configured to make the propagation measurements at one or more frequencies in a range from about 200 kHz to about 4 MHz.

12. The system of claim 10, wherein the processing comprises computing partial derivatives of a phase shift and an attenuation of simulated electromagnetic propagation measurements with respect to conductivity and dielectric constant of the plurality of formation layers.

13. The system of claim 12, wherein the computing the partial derivatives comprises computing a partial derivative of a natural log of a real portion of an acquired voltage measurement with respect to the conductivity and the dielectric constant of the plurality of formation layers and a partial derivative of a natural log of an imaginary portion of an acquired voltage measurement with respect to the conductivity and the dielectric constant of the plurality of formation layers.

14. The system of claim 10, wherein the cost function is a discretized relation depending on the conductivity and the dielectric constant values of each of the plurality of formation layers.

15. The system of claim 10, wherein the minimizing the cost function comprises an L1-norm regularization of the smoothing term that includes an iterative process to compute a searching direction at each step of a Gauss-Newton process.

16. An article of manufacture comprising tangible, non-transitory, machine-readable media comprising instructions that, when executed by a processor, cause the processor to:
    receive electromagnetic propagation measurements made by a downhole electromagnetic logging tool; and
    process the electromagnetic propagation measurements via inversion using a one-dimensional formation model including a plurality of formation layers to compute resistivity and dielectric constant values of each of the plurality of formation layers, wherein the electromagnetic propagation measurements are inverted via minimizing a discretized cost function comprising a misfit term, an entropy term, and a smoothing term, and wherein the misfit term, the entropy term, and the smoothing term are each dependent on the conductivity and the dielectric constant values of each of the plurality of formation layers.

17. The article of claim 16, wherein:

the processing comprises computing partial derivatives of a phase shift and an attenuation of simulated electromagnetic propagation measurements with respect to conductivity and dielectric constant of the plurality of formation layers; and the computing the partial derivatives comprises computing a partial derivative of a natural log of a real portion of an acquired voltage measurement with respect to the conductivity and the dielectric constant of the plurality of formation layers and a partial derivative of a natural log of an imaginary portion of an acquired voltage measurement with respect to the conductivity and the dielectric constant of the plurality of formation layers.

18. The article of claim 16, wherein:

the minimizing the cost function comprises an L1-norm regularization of the smoothing term that includes an iterative process to compute a searching direction at each step of a Gauss-Newton process.

\* \* \* \* \*